Nov. 2, 1965 R. STEFANSSON 3,216,021

RECORD MEDIUM TRANSPORT MECHANISM

Filed March 16, 1964 3 Sheets-Sheet 1

INVENTOR.
RAFN STEFANSSON

BY Elber J. Hyde
ATTORNEY

INVENTOR.
RAFN STEFANSSON
BY
Elber J. Hyde
ATTORNEY

RECORD MEDIUM TRANSPORT MECHANISM

Filed March 16, 1964 3 Sheets-Sheet 3

INVENTOR.
RAFN STEFANSSON

BY Elber J. Hyde
ATTORNEY

United States Patent Office 3,216,021

Patented Nov. 2, 1965

3,216,021

RECORD MEDIUM TRANSPORT MECHANISM

Rafn Stefansson, Sierra Madre, Calif., assignor to Clevite Corporation, a corporation of Ohio Filed Mar. 16, 1964, Ser. No. 351,900
7 Claims (Cl. 346—136)

This invention pertains to a record medium transport system for a recording instrument such as a pen recorder, a light recorder, or the like.

In systems wherein a long strip of record medium is utilized it is often desirable to spool the recorded medium and at other times it is desirable to have the recorded record immediately visible as it comes out of the recording instrument in a loose condition. Instruments of this general type should have a wide range of record medium speed and it is essential that once the operator selects a given speed for the record medium the speed remain constant.

It is an object of the present invention to provide a record medium transport system wherein the record medium after recording may be internally spooled or it may be driven out of the instrument so that the record is immediately visible to the operator.

It is another object of the present invention to provide a record medium transport system for a recording instrument wherein the record medium may be driven at any one of a selected number of speeds and wherein the record medium speed once selected will remain constant even though the record medium is being spooled on a wind-up spool.

Another object of the present invention is to provide a record medium transport system for a recording instrument wherein a single drive system may be utilized to drive the record medium at a constant speed in either one of two positions; in one driving position the record medium is ejected to the outside of the instrument and in the other driving position the record medium is internally spooled.

Another object of the present invention is to provide a record medium transport system for a recording instrument wherein the record medium may be a film and wherein the transport system can be used with the emulsion side of the film facing in toward the roll or facing away from the roll.

For a better understanding of the present invention, together with other and further objects thereof, reference is had to the following description taken in connection with the accompanying drawings, and its scope will be pointed out in the appended claims.

An aspect of the present invention lies in the provision in a record medium transport system for a recording instrument wherein a single drive roller is pivotally mounted within a housing so that it may be selectively positioned into either one of two driving positions. A single motor and transmission means is mounted within the housing so that it can drive the roller at any one of a plurality of speeds with the roller in either of the two driving positions. A recording roller is mounted within the housing and a supply spool supplies the record medium to the recording roller. The drive roller in one of its two driving positions pinches the record medium against the recording roller, thereby driving both the record medium and the recording roller at a constant speed. A take-up spool is adapted to be mounted in the housing for spooling the record medium, and the drive roller in its other driving position engages and drives the take-up spool and the record medium thereon so that the record medium moves at a constant speed.

With reference to the drawings there is shown in FIGURE 1 an isometric view of the front face of the recording instrument showing the drive roller in its position to eject a record medium out of the housing;

Figure 1:
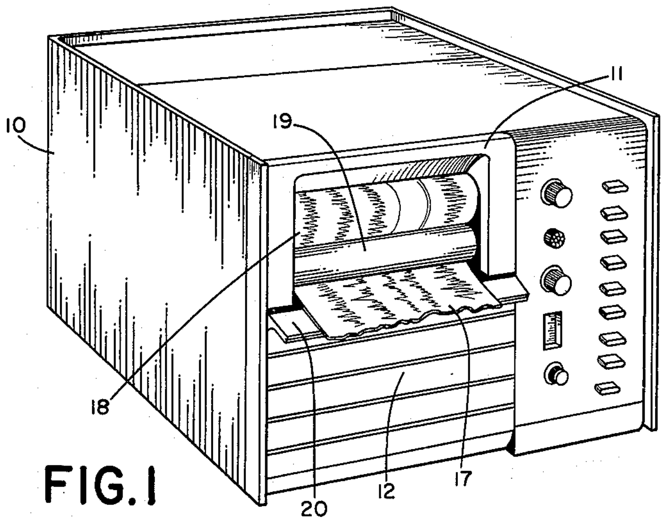
Figure 3:
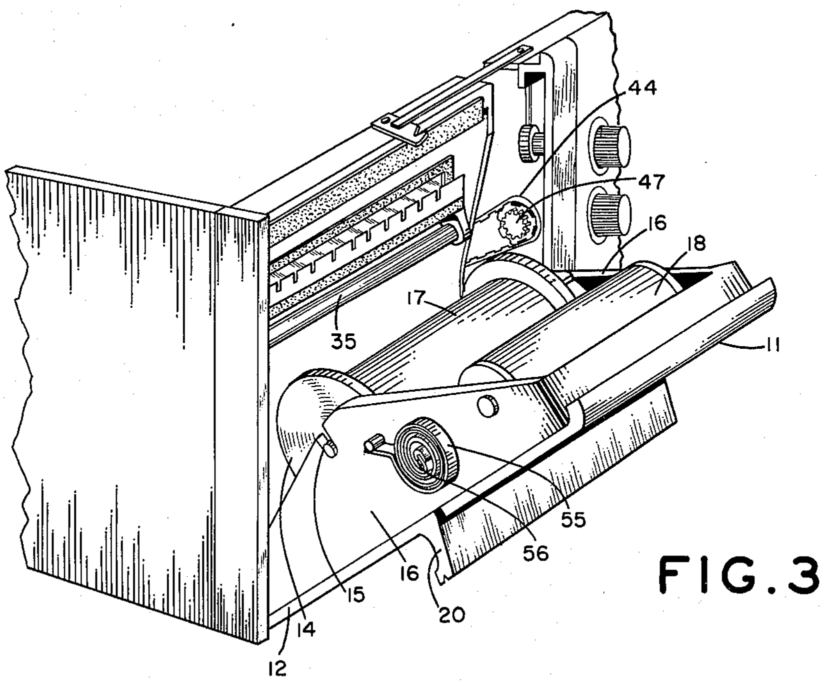
FIGURE 3 is an isometric, partially broken-away view showing the recorder with its front panel open.

With reference to FIGURE 1 the instrument comprises a housing 10 having a front panel 11. A front door 12 comprises part of the front panel 11 and as shown in FIGURE 3, the front panel 11 and the front door 12, as a unit, may be pivoted away from the housing 10 about a pivot shaft 13 extending along the bottom of the housing 10.

Figures 2, 10:
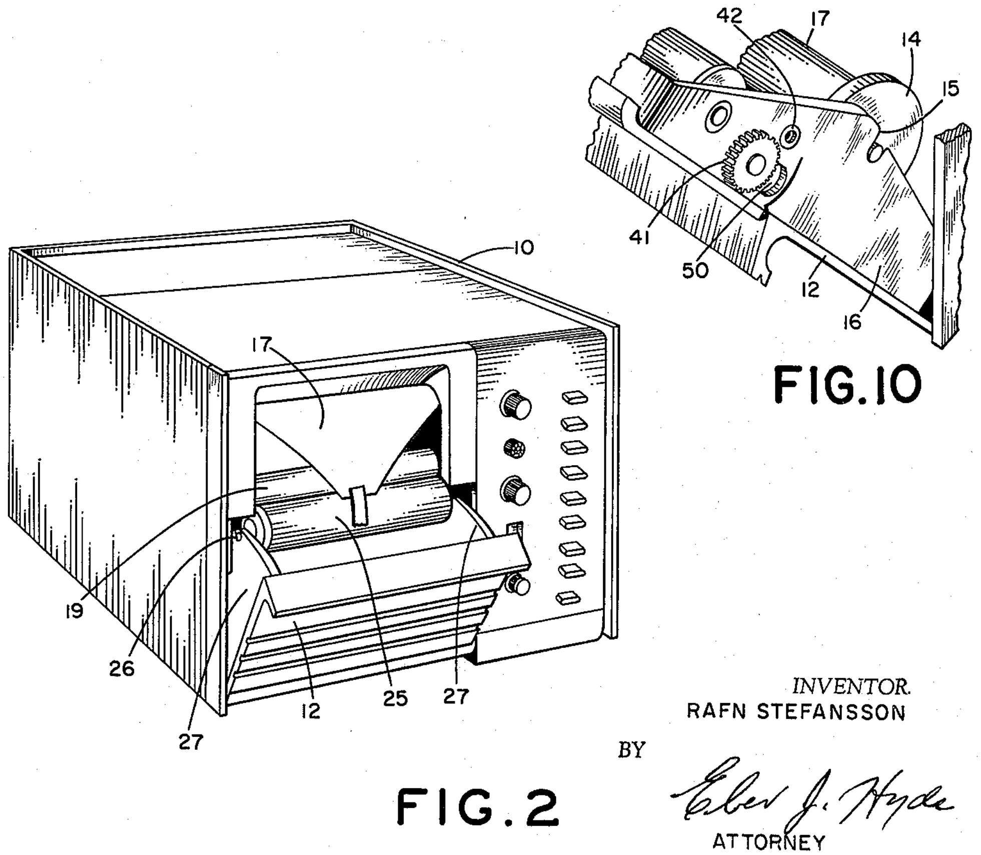
FIGURE 2 is an isometric view of the front of the recording instrument showing the drive roll and the take-up spool in position to internally rewind the exposed record medium.
FIGURE 10 is a fragmentary isometric view showing a portion of the side of the front panel and showing the supply spool and the recording roller.

As shown in FIGURE 2 the front door 12 may be pivoted away from the front panel 11 about the pivot shaft 13, and a torsion spring, not shown, located in the lower right-hand portion of the housing provides a bias through the shaft 13 tending to close the door 12. A supply spool 14 of film, paper 17 or the like is mounted in notches 15 in the sides 16 of the front panel 11. The record medium 17 which is wound on the supply spool 14 in one driving position shown in FIGURE 1 extends around a recording roller 18, then behind a drive roller 19, and then extends across the outwardly extending handle 20 of the front door 12 to an external position where the operator may substantially immediately see the record which is on the record medium 17. In its other driving position, shown in FIGURE 2, the record member 17 is wound on a take-up spool 25 which is mounted in notches 26 in the side walls 27 of the front door 12.

Figure 6:
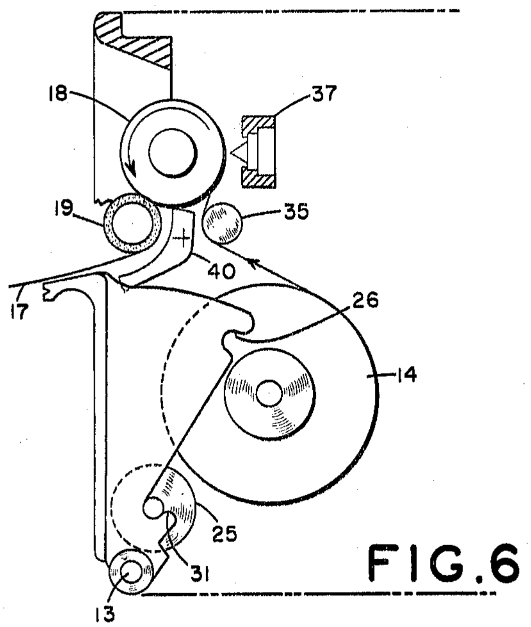
FIGURE 6 is a schematic side view of the device showing the driving roller in one driving position.
Figure 7:
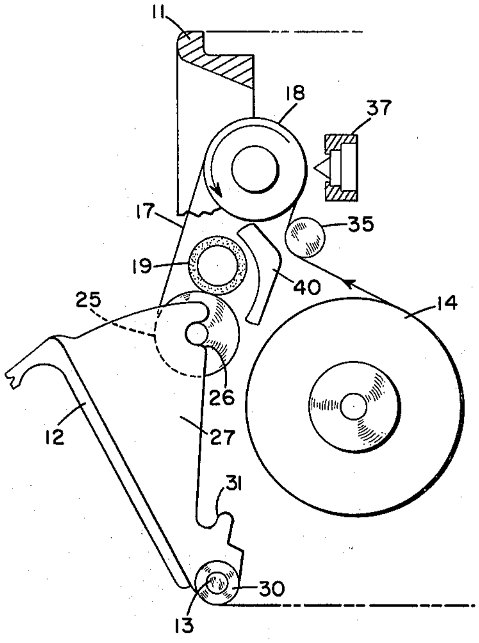
FIGURE 7 is a schematic side view showing the drive roller in its other driving position.

In the one driving position where the record member 17 is driven or ejected to the outside of the housing the drive roll 19, as shown in FIGURE 6, is against the recording roller 18 with the record member 17 pinched between the two. Thus constant rotary motion of the drive roller 19 imparts constant linear motion to the record medium 17. In its other driving position shown in FIGURE 7, the front door 12 is open and the take-up spool 25 is mounted in the notch 26 and is held there by the drive roller 19. The front door 12 is biased by a torsion spring 30 mounted around the pivoted shaft 13 in such a manner as to strongly bias the take-up spool 25 against the drive roller 19. The take-up spool 25 when it is not in use, as shown in FIGURE 7, is stored in the notches 31 in the lower edge of the front door 12, as shown in FIGURE 6. Constant rotary motion of the drive roller 19, through the take-up spool 25, imparts constant linear motion to the record medium 17 in this driving position.

Figure 8:
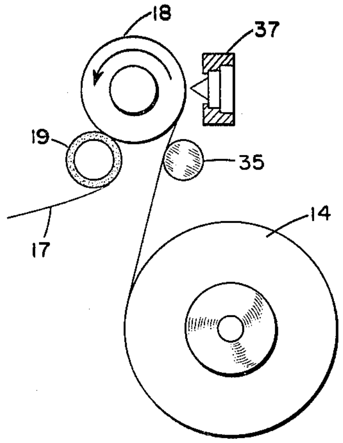
FIGURE 8 is a schematic view showing the supply spool and its method of mounting in the instrument if the record medium is a film with its emulsion side directed inwardly.

As shown in FIGURE 7, the record medium extends from the supply spool 14 around an idler roller 35, around the recording roller 18 and then either to the outside of the housing as shown in FIGURE 6 or to the take-up spool 25 as shown in FIGURE 7. If the record medium is a film with the emulsion side out it is mounted as shown in FIGURE 7. If it is a film with the emulsion side in, it is mounted as shown in FIGURE 8. Reference character 37 indicates a lens system for exposing the film. The other parts of the system are not shown.

A guide 40 comprises part of a drive roller subassembly, and the drive roller and guide 40 as a unit move from the one driving position shown in FIGURE 6 to the other driving position shown in FIGURE 7. A spring 55 mounted on one of the sides 16 of the front panel 11, through a shaft 56, biases the drive roller 19 and the guide 40 into the driving position shown in FIGURE 6.

Figure 9:
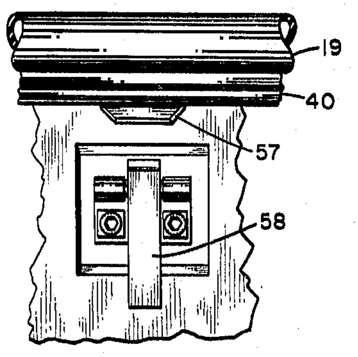
FIGURE 9 is a fragmentary view showing the latch mechanism for holding the drive roller in its alternative driving position.

As shown in FIGURE 9, when it is desired to rewind the record member rather than to eject it, the operator manually rotates the drive roller guide unit about its pivot points 42 by pushing them downwardly against the bias of spring 55 until a catch 57 mounted on the guide 40 hooks under a latch 58 mounted on the front face of the panel 11 behind the door 12. Manual release of the latch 58 permits the spring 55 to return the drive roller guide unit to its original position.

Figure 4:
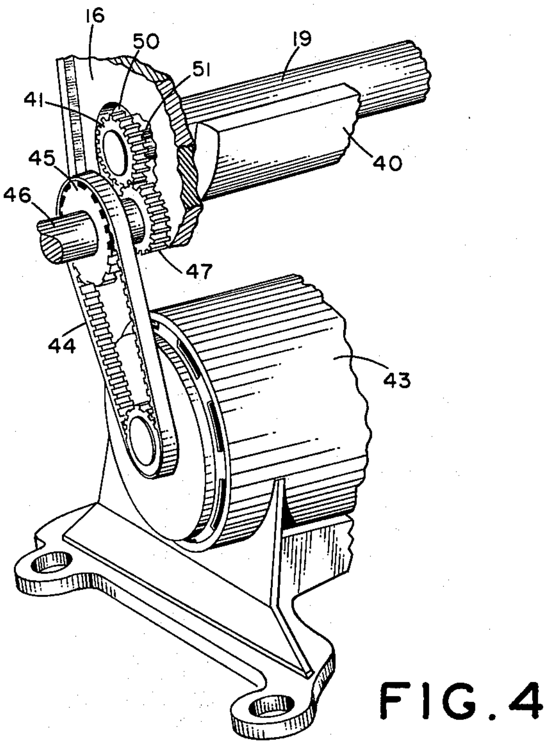
FIGURE 4 is an isometric, partially broken-away view showing the motor transmission and drive chain to the drive roller which is in one of its two driving positions.
Figure 5:
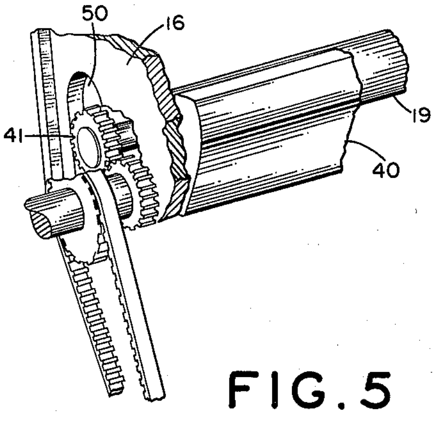
FIGURE 5 is an isometric, partially broken away view showing the drive roller in its other driving position.

As shown in FIGURES 4 and 5 the drive roller 19 terminates in a spur gear 41 which is journaled for rotary motion in the side 16 of the front panel 11. The guide 40 is journaled for rotary motion by the bearing 42 shown in FIGURE 10. The drive roller 19 and the guide 40 pivot as a unit about the bearing 42 from the one driving position shown in FIGURE 6 to the other driving position shown in FIGURE 7. A slot 50 in the side wall 16 permits lateral motion of the shaft 51 which connects the gear 41 to the drive roller 19.

Within the housing 10 there is mounted a motor and transmission unit 43 which drive a timing belt 44 which rotates the gear 45 mounted on the shaft 46. A drive gear 47 mounted on the shaft 46 extends inwardly and meshes with the gear 41 on the drive roller 19. When the front panel 11 is closed the pivot of the guide 40 is coaxially aligned with the shaft 46 and the gear 41 meshes with the gear 47. As the guide 40 and the drive roller 19 are pivoted from one driving position to another, the gear 41 arcuately moves around the driving gear 47 but always remains meshed with it. Thus the single motor and transmission unit 43, through the timing belt 44 and the driving gear 47, drive the drive roller 19 in either of its two driving positions.

While there have been described what are at present considered to be the preferred embodiments of this invention, it will be obvious to those skilled in the art that various changes and modifications may be made therein without departing from the invention, and it is, therefore aimed in the appended claims to cover all such changes and modifications as fall within the true spirit and scope of the invention.

I claim:

1. A record medium transport system for an instrument, comprising, in combination: a housing, a drive roller, pivot means mounting said drive roller within said housing for pivotal motion into either one of two driving positions, motor means mounted within said housing for driving said drive roller in either of said two driving positions, a recording roller, a supply spool mounted in said housing for supplying said record medium to said recording roller, said drive roller in one of its two driving positions pinching said record medium against said recording roller and driving both said record medium and said recording roller, a take-up spool adapted to be mounted in said housing and upon which said record medium is adapted to be spooled, said drive roller in its other driving position engaging and driving said take-up spool.

2. A record medium transport system for an instrument as set forth in claim 1, further characterized by record medium guide means connected to said drive roller for pivotal motion therewith into either of two positions.

3. A record medium transport system for an instrument as set forth in claim 1, further characterized by an idler roller mounted in said housing between said supply spool and said recording roller for guiding said record medium from the supply spool to said recording roller, and further characterized by said supply spool being mountable in said housing in either of two end-for-end positions, said idler roller guiding said record medium in both of said two spool positions.

4. A record medium transport system for an instrument, comprising in combination, a housing including a front door, means pivoting said door along its bottom edge to said housing whereby its upper edge is adapted to move away from said housing, door spring means biasing the upper edge of said door against said housing, a drive roller, pivot means mounting said drive roller within said housing for pivotal motion into either of two driving positions, motor means mounted within said housing for driving said drive roller in either of said two driving positions, a recording roller, a record medium supply spool mounted in said housing for supplying said record medium to said recording roller, said drive roller in one of its two driving positions pinching said record medium against said recording roller and driving both said record medium and said recording roller, and a take-up spool adapted to be pivotally mounted near the upper edge of said front door, said door spring means through said door biasing said take-up spool against said drive roller for spooling said record medium when said drive roller is in its other driving position out of engagement with said recording roller.

5. A record medium transport system for an instrument as set forth in claim 4, further characterized by means near the bottom of said take-up spool out of engagement with said driving roller when said drive roller is in its one driving position.

6. A record medium transport system for an instrument, comprising, in combination, a housing having a front panel and including in said front panel a front door, means pivoting said front panel and said front door along their bottom edges to said housing whereby the upper edge of said panel is adapted to move away from said housing and the upper edge of said door is adapted to move away from said panel, spring means biasing the upper edge of said door against said panel, a drive roller, pivot means mounting said drive roller on said panel for pivotal motion into either of two driving positions, motor means mounted within said housing for driving said drive roller in either of said two driving positions, a recording roller mounted on said panel, a record medium supply spool mounted on said panel for supplying said record medium to said recording roller, said drive roller in one of its two driving positions pinching said record medium against said recording roller and driving both said record medium and said driving roller, and a take-up spool adapted to be pivotally mounted near the upper edge of said front door, said door spring means through said door biasing said take-up spool against said drive roller for spooling said record medium when said drive roller is in its other driving position out of engagement with said recording roller.

7. A record medium transport system for an instrument, comprising, in combination, a housing, drive roller means including a gear, pivot means mounting said drive roller means within said housing for pivotal motion into either one of two driving positions, motor means mounted within said housing, driving gear means mounted in said housing for rotation about an axis and meshed with said drive roller gear, means connecting said motor means to said driving gear means, the axis of said pivot means being coaxial with the axis of said driving gear means whereby said drive roller gear is meshed with said driving gear means when said drive roller means is in either of said two driving positions.

References Cited by the Examiner

UNITED STATES PATENTS

| | | | |
|---|---|---|---|
| 2,718,450 | 9/55 | Leonard et al. | 346—68 X |
| 2,913,299 | 11/59 | Clift | 346—136 X |

LEO SMILOW, *Primary Examiner.*